Aug. 18, 1936.   F. W. ILSEMAN   2,051,085
UNIVERSAL COUPLER
Filed Dec. 17, 1934
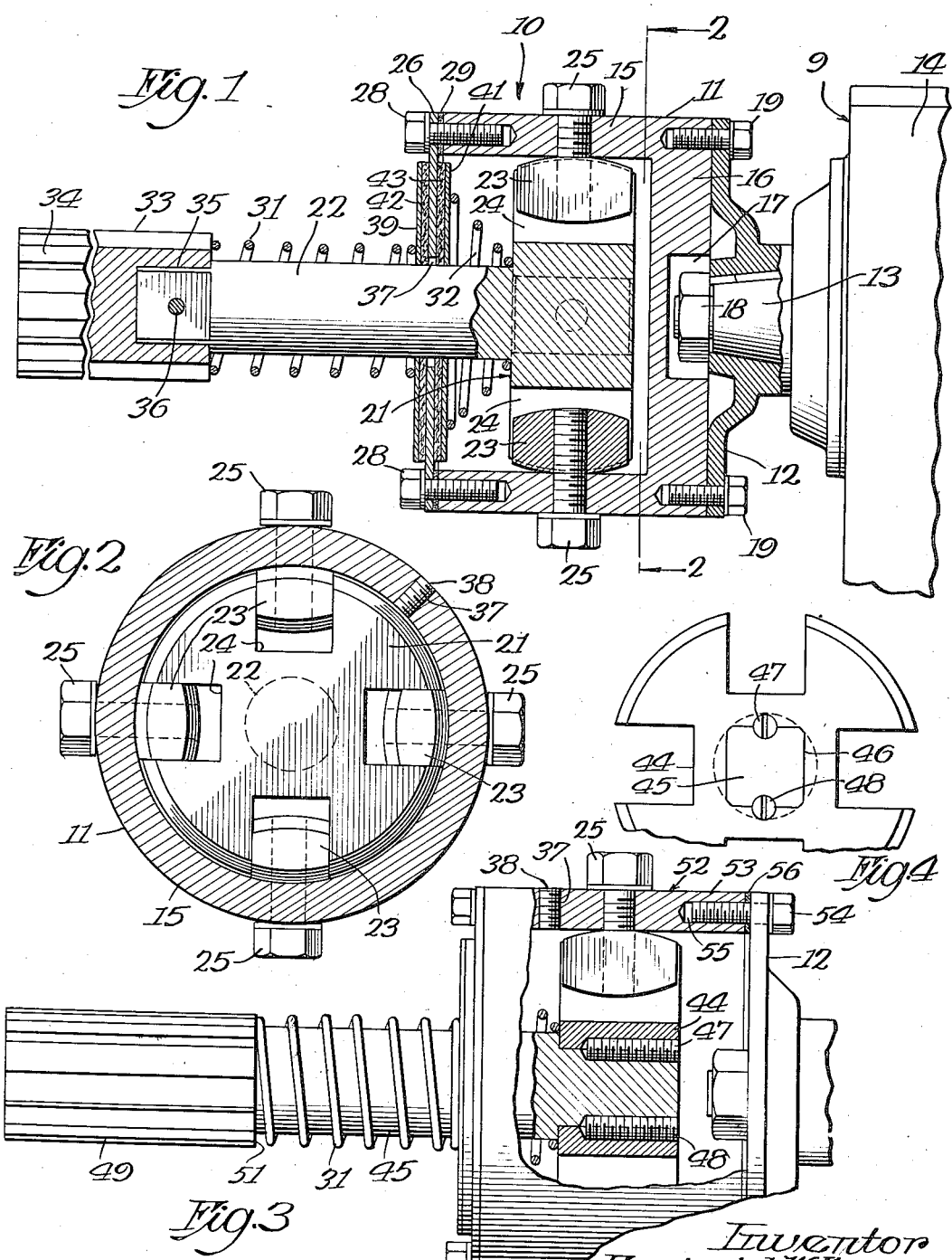
Inventor
Frederick W. Ilseman
By Gibson, Mann & Ottys
Attys.

Patented Aug. 18, 1936

2,051,085

UNITED STATES PATENT OFFICE 2,051,085

UNIVERSAL COUPLER

Frederick W. Ilseman, Aurora, Ill.

Application December 17, 1934, Serial No. 757,856

8 Claims. (Cl. 64—8)

This invention relates to universal connectors especially adapted for use in connecting the sections of a drive shaft of motor vehicles and the like, which are arranged at an angle to each other.

One of the objects of the invention is the provision of a new and improved universal connector for drive shafts and the like comprising a novel head and socket connection between the two sections of the shaft.

A further object of the invention is the provision of a new and improved universal connector member for sections of a drive shaft comprising cooperating head and socket members having novel means for positioning the head within the socket.

Another object of the invention is the provision of a new and improved universal connector between two sections of a rotating shaft that is provided with novel means for lubricating the relatively movable parts of the connector.

A further object of the invention is the provision of a new and improved universal connector for sections of a shaft that is simple in construction, inexpensive to manufacture, easy to install, efficient in use, one in which wear of the parts will be reduced to a minimum, and one in which, if wear should occur, it will not cause eccentric rotation of either shaft section during the operation of the device.

Other and further objects and advantages of the invention will appear from the following description taken in connection with the accompanying drawing, in which:

Fig. 1 is a vertical section of the device applied to a motor vehicle with pieces omitted and parts broken away;

Fig. 2 is a section on the line 2—2 of Fig. 1;

Fig. 3 is an elevation of a modified form of construction with parts in section and parts broken away;

Fig. 4 is an end elevation of the driving head of the form of construction shown in Fig. 3 with parts broken away.

In the use of the conventional universal joint between the drive and driven shafts of an automobile, it is not uncommon for the parts to wear so that the driven shaft will rotate eccentrically, thus causing objectionable vibration of the vehicle at high speeds. Furthermore, since the advent of high speeds, more or less difficulty has been experienced in retaining grease on the universal joint mechanism to properly lubricate the same due to centrifugal action and ill-fitting joints.

The present invention seeks to remedy these defects by the provision of a new and improved connector so constructed that proper lubrication is insured, the wear on the parts is reduced to a minimum and even though the driving parts become worn, they will not cause the driven shaft to rotate eccentrically.

Referring now to the drawing, the reference character 9 designates generally the transmission mechanism of a motor vehicle to the drive shaft of which is connected the universal connector 10. This connector comprises a driving head receiving member or socket member 11 which is adapted to be rigidly connected to a flange 12 keyed to the driven shaft 13 of the transmission and extending rearwardly from the gear case 14 of the motor vehicle. This socket comprises the circular side wall 15 and a bottom wall 16. The bottom wall 16 is provided with a recess 17 for providing clearance for the nut 18 on the end of the driven shaft 13 which secures the flange member 12 in position on the drive shaft 13. Any suitable means may be employed for attaching the flange member 12 to the socket. In the form of construction shown, cap screws 19 are employed.

A driving head 21 is adapted to be received in the driving head receiving member or socket 11. A driven shaft 22 is rigidly connected to this head in any suitable manner, as by being cast integral therewith, as shown in Figs. 1 and 2. The head is circular and conforms to the inner periphery of the socket member 11.

Suitable means are provided for connecting the socket to the head 21 for driving the latter. As shown, this means comprises a plurality of driving lugs 23 which are connected to the socket and are adapted to engage in corresponding radially extending recesses 24 in the head 21. In order to give freedom of movement, the driving lugs 23 are supported by radially extending threaded pins or bolts 25 which extend through the circular wall 15 of the socket. These bolts are threaded into the driving lugs whereby the lugs are held in proper position, and at the same time are free to rotate slightly in either direction during the operation of the connector member. Preferably, though not necessarily, the inner and outer faces of these lugs are curved both longitudinally and transversely. They curve transversely to conform to the curvature of the inner surface of the wall 15 and are curved longitudinally to provide clearance to permit the head 21 to move angularly relative to the axis of the socket.

Appropriate means are provided for maintaining the head in driving position within the socket 11. In the form of construction shown, a closure plate 26 provided with an enlarged central opening 27 through which the driving shaft 22 is adapted to extend, is secured to the outer end of the socket 11 in any suitable manner, as by means of the cap screws 28.

In order to make the joint grease-proof, a gasket 29 is clamped between the plate 26 and the end of the socket 11. The head 21 is held in central or driving position by a spring 31 on one side of the plate 26 opposed by a spring 32 on the other side thereof. The resistance of these springs is such as to properly center the head 21.

In order to assemble the springs 31 and 32 on the shaft 22, the slip joint member 33 having the internal splines 34 is made separate from the shaft and is detachably attached thereto in any suitable manner. As shown, the slip joint member 33 is provided with a squared opening 35 which receives the outer squared end of the shaft 22 and is held assembled by means of a bolt or rivet 36.

The wall 15 of the socket 11 is preferably provided with an opening 37 through which oil or grease is supplied to the interior of the socket. This opening may be closed by a set screw 38. In order to prevent the oil or grease from escaping along the shaft 22, there is provided at each side of the closure plate 26 what might be termed washers 39 and 41 having axial openings through which the shaft 22 extends. These openings are but slightly larger than the shaft. A gasket or fiber washer 42 is inserted between the outer washer 39 and the plate 26, and a similar gasket or fiber washer 43 is inserted between the washer 41 and the plate 26. These washers are provided with axial openings which make a tight fit on the shaft 22 for preventing the escape of oil or grease along the shaft. During the operation of the device, these washers and gaskets are free to slide back and forth on the plate 26 at each rotation of the shaft.

In the operation of the device, assuming that the axis of the shaft 22 is at an angle to that of the driving shaft 13, the head 21 rocks relative to the driving lugs 23 during each rotation of the shaft and the driving lugs 23 will also oscillate slightly back and forth about the pins or bolts 25 due to this angularity. The springs 31 and 32 will hold the head properly centered and prevent the same from coming in contact with the bottom wall of the socket.

The washers 39 and 41, together with the gaskets 42 and 43, will move back and forth on the plate 26 during each rotation.

Should wear occur, it will be between the driving lugs and the side walls of the recesses 24, but since the head fits snugly within the socket 11, the parts will be prevented from moving eccentrically to each other. This is considered an important feature of the invention because in the conventional universal joint when the same becomes worn, there is nothing to hold the parts to prevent this eccentric motion.

In the form of construction shown in Figs. 1 and 2, the socket is provided with an integral bottom wall which will prevent the escape of grease from that side of the socket, and on the opposite side there is but little strain on the plate 26, and, consequently, there is little likelihood of the plate becoming loose. As a result of this construction, grease supplied to the socket is all retained therein. This is also considered an important feature of applicant's invention because in the conventional construction, the interior of a universal connector is in communication with the joint between the driving flange 12 and the connector. Since all the driving strain is on these screws that connect the parts together, they are likely to become loosened, and since the connector or shaft rotates at a high speed, the oil will soon escape through this loosened joint.

In the form of construction shown in Figs. 3 and 4, the head 44 is separate from the driven shaft 45, and is attached thereto in any suitable manner. In the form shown, the inner end of the shaft 45 is squared and engages in a corresponding square opening 46 through the head. Set screws 47 and 48 engaging in a tapped opening, partly in the shaft and partly in the head, hold the parts in assembled relation. The slip joint member 49 may be cast integral with the shaft 45 and in that way provides a shoulder 51 for the spring 31.

In this form of construction, the head receiving or socket member 52 comprises a cylindrical wall or band 53, the outer end of which is adapted to be secured to the driving flange 12 of the transmission in any suitable manner, as by means of the bolts 54 which extend through the flange and engage in threaded openings 55 in the edge of the cylindrical wall 53 of the head. In this form of construction, the flange 12 constitutes the bottom of the socket member 52. A gasket 56 is preferably clamped between the flange 12 and the end of the cylinder wall 53 to form an oil tight joint.

It is thought from the foregoing taken in connection with the accompanying drawing that the construction and operation of my device will be apparent to those skilled in the art, and that minor changes in size, shape, proportion and details of construction may be made without departing from the spirit and scope of the appended claims.

I claim as my invention:—

1. In a universal coupler for shaft sections comprising a head member, a socket member for receiving said head member, a closure for said socket member, means for interlocking said members together, and resilient means engaging opposite sides of said closure for positioning said head member within said socket member.

2. A universal connector comprising a socket member, threaded bolts extending radially into said socket member, driving lugs threaded on said bolts and rotatable thereon, a head having radial recesses for receiving said lugs, a shaft secured to said head and extending outwardly from said socket, a plate secured over the open end of said socket, said plate having an enlarged axial opening through which said shaft extends, a washer on said shaft at each side of said plate, a gasket between each washer and plate, and means for resiliently clamping said gaskets between said plate and washers for retaining grease within said socket.

3. In a motor vehicle provided with transmission mechanism having a driving shaft, a driving flange keyed to said shaft, a cylindrical member having one end clamped to said flange, said flange forming a closure for one end of said cylindrical member, a closure having an enlarged axial opening secured over the opposite end of said member, a driving head within said member, driving connections between said head and member, a driven shaft secured to said head and extending through said enlarged opening, and gaskets secured to said driven shaft at opposite sides of said last-named closure, and resilient means for holding said gaskets in contact with said last-named closure, said means functioning to position said head within said cylindrical member.

4. In a motor vehicle having a drive shaft, a driving flange secured to said shaft, a universal connector comprising a head receiving member, a head within said member, driving connections between said member and head, means for securing said member to said flange, and a closure for the end of said member opposite said flange comprising a plate having an enlarged axial opening, a driven shaft secured to said head and extending outward through said opening, a fiber gasket on said driven shaft at opposite sides of said plate, and means for yieldingly pressing said gaskets against said plates, said means functioning to position said head within said receiving member.

5. In a motor vehicle having a transmission comprising a drive shaft, a driving flange on said shaft, a head receiving member having one end rigidly secured to said driving flange, a closure plate rigidly secured to the other end of said member, a head having a driven shaft rigidly connected thereto, said shaft extending out through an enlarged opening in said plate, a gasket element at each side of said plate and slidably engaging the same, and resilient means for pressing said gaskets against said plate for forming a grease retaining joint between said plate and gaskets and for positioning said head relatively to said head receiving member.

6. In a universal coupler for shaft sections comprising two connector members, said members comprising an element having a cylindrical bore and end walls, at least one of which is removable, the other connector member extending into said bore through one of said walls and having a head of slightly less diameter than said bore, an interlocking connection between said head and element, and resilient means on opposite sides of one of said end walls for positioning said head within said bore in spaced relation to the other end wall.

7. A universal coupler for shaft sections comprising two connector members, one of said members comprising an element having a cylindrical socket therein, the other member having a shaft extending through an enlarged opening in an end wall of said socket and provided with a head in said socket of slightly less diameter than the socket, interlocking connections between said head and socket element, grease retaining means at opposite sides of end wall for closing said enlarged opening, and resilient means at opposite sides of said grease retaining means for clamping the same against said end wall and for positioning said head within said socket.

8. A universal coupler for shaft sections comprising two connector members, one of said members comprising an element having a cylindrical bore therein, a closure for each end of said bore, the other member having a head extending into said bore, said head being of slightly less diameter than the bore and having its peripheral surface curved both longitudinally of and transversely to the axis of the head, interlocking connections between said head and socket element, and mechanism including resilient means located outwardly of said head in one direction only and surrounding the shaft section to which said head is attached, for resiliently resisting the longitudinal movement of said shaft in either direction for positioning said head within said bore spaced from said closures.

FREDERICK W. ILSEMAN.